Patented Apr. 22, 1930

1,755,242

UNITED STATES PATENT OFFICE

COURTNEY CONOVER, OF ST. LOUIS, MISSOURI, ASSIGNOR TO MONSANTO CHEMICAL WORKS, OF ST. LOUIS, MISSOURI, A CORPORATION OF MISSOURI

PROCESS OF REFINING CRUDE PHTHALIC ANHYDRIDE

No Drawing.     Application filed November 29, 1926.  Serial No. 151,605.

This invention relates to processes of the kind that are used in the operation of refining phthalic anhydride.

Crude phthalic anhydride generally contains small proportions of a number of foreign substances, such as naphthalene, alpha-naphtho-quinone, maleic anhydride, benzoic acid and certain dark colored compounds, and when the crude phthalic anhydride is subjected to distillation or sublimation in the operation of refining it, the impurities which are volatile frequently pass over with the phthalic anhydride, the colored impurities being particularly objectionable in the refined product, this being especially true of some types or kinds of phthalic anhydride that contain volatile colored material having some of the properties of quinones.

I have discovered that the purification of crude phthalic anhydride by distillation or sublimation is greatly facilitated and the production of a pure colorless product assured, if a reagent that has a reducing action at temperatures above 130° C., or even above 100° C. and which has the property of combining with phenols to form compounds having vapor pressures lower than that of phthalic anhydride, is added to the crude phthalic anhydride prior to distillation or sublimation. Accordingly, I have devised a process for refining crude phthalic anhydride which contemplates subjecting the crude material to the action or a reagent which will render the quinone or quinone-like substances in the crude material practically non-volatile, preparatory to subjecting the phthalic anhydride to distillation or sublimation. Aldehydes and substances which may be decomposed to form aldehydes are reagents that have this desirable characteristic. Presumably, aldehydes act by combining with quinones to form resinous materials, perhaps first reducing the quinones to phenols. I wish it to be understood, however, that my discovery or invention is not limited to the use of reagents consisting of substances commonly recognized as aldehydic in character, as certain other compounds not generally classed as aldehydes can be used in practising my process. Accordingly, I have herein used the term "aldehydic condensation reagent" to mean either an aldehyde or a compound which may be caused to decompose with the formation of an aldehyde. I have obtained the best results with trioxymethylene, although furfural and paraldehyde are effective. Glucose and formic acid, which seem to act as aldehydes, are capable of use with my process and also glycerol when used at a high temperature, as glycerol at high temperatures forms an aldehyde by decomposition.

The aldehydic condensation reagent contemplated by my process may be used in many different ways, and in different proportions, depending upon the type or kind of crude phthalic anhydride being treated. It may be used in the presence of other reagents and its use may be only one of several steps in a complete process of purifying or refining crude phthalic anhydride. One procedure that can be followed in practising my process is as follows: The reagent consisting of trioxymethylene is added to the crude phthalic anhydride in approximately the proportions of 0.3 to 3.0 parts of trioxymethylene to 100 parts of crude phthalic anhydride, the quantity of reagent that is added depending upon the type or kind of crude material being refined. Approximately 5 parts of water is then added and the mixture is heated until the anhydride is melted, but some solid phthalic acid remains, the heating operation being continued at a temperature of from 155° C. to 165° C. for approximately three hours. Thereafter, the temperature is raised sufficiently to cause the batch to boil freely, and it is maintained at the boiling point, usually for about one hour. With some types of crude phthalic anhydride better results are attained if the period of boiling is increased to several hours. Subsequently, the phthalic anhydride is separated from the more volatile and also from the less volatile constituents of the mass by distillation or sublimation in any preferred manner, the term "volatilization and fractional condensation" being herein used to include either of the above mentioned means of separating the substantially pure phthalic anhydride from the mass.

Having thus described my invention, what I claim as new and desire to secure by Letters Patent is:

1. In a process of refining crude phthalic anhydride, the steps of adding an aldehydic reacting body to the crude material, and then boiling the mass.

2. In a process of refining crude phthalic anhydride, the step of adding an aldehydic condensation reagent to the crude material.

3. In a process of refining crude phthalic anhydride, the step of adding to the crude material a reagent which may be caused to decompose with the formation of an aldehyde.

4. In a process of refining crude phthalic anhydride, the step of adding to the crude material a reagent, which, in the presence of water and of phthalic acid, will decompose with the formation of an aldehyde.

5. In a process of refining crude phthalic anhydride, the step of adding to the crude material a reagent, which, in the presence of phthalic acid at temperatures above 100° C., will decompose with the formation of an aldehyde.

6. In a process of refining crude phthalic anhydride, the step of adding to the crude material an aliphatic aldehydic condensation reagent.

7. In a process of refining crude phthalic anhydride the step of adding to the crude material a reagent, which, in the presence of at least one of the following materials, namely, phthalic anhydride, and phthalic acid at temperatures above 130° C., has reducing properties and will combine with phenols.

8. In a process of refining crude phthalic anhydride the step of adding to the crude material a reagent, which, in the presence of phthalic anhydride and of phthalic acid at temperatures above 130° C., has reducing properties and will combine with phenols to form compounds having corresponding vapor pressures.

9. In a process of refining crude phthalic anhydride, the step of adding trioxymethylene to the crude material.

10. A process of refining crude phthalic anhydride, which consists in adding from 0.3 to 3.0 parts of trioxymethylene to the crude material, then adding some water and subjecting the mixture to sufficient heat to cause the anhydride to melt, continuing the heat treatment for 1 to 4 hours at a temperature between 155° C. and 165° C., then boiling the mass, and then separating the phthalic anhydride from more volatile and less volatile constituents of the mass by volatilization and fractional condensation.

11. A process of refining crude phthalic anhydride which consists in adding an aliphatic aldehydic condensation reagent and water to the crude material, heating at a temperature above the melting point of phthalic anhydride but below 165° C., for at least 1 hour, boiling the mass for at least 1 hour, and then separating the phthalic anhydride from more volatile and less volatile constituents of the mass by volatilization and fractional condensation.

12. A process of refining crude phthalic anhydride which consists in adding trioxymethylene and water to the crude material, heating at a temperature above the melting point of phthalic anhydride but below 165° C., for at least 1 hour, boiling the mass for at least 1 hour, and then separating the phthalic anhydride from more volatile and less volatile constituents of the mass by volatilization and fractional condensation.

COURTNEY CONOVER.